United States Patent Office 3,360,431
Patented Dec. 26, 1967

3,360,431
COMPOSITIONS AND METHOD FOR INCORPORATING MICROBIOCIDAL AMOUNTS OF ARSENOSOBENZENE INTO RESINS
Charles C. Yeager, Glen Ellyn, Ill., assignor to Scientific Chemicals, Inc., a corporation of Illinois
No Drawing. Filed Mar. 15, 1965, Ser. No. 439,986
The portion of the term of the patent subsequent to Nov. 29, 1983, has been disclaimed
12 Claims. (Cl. 167—30)

This invention relates to resinous materials having bactericidal properties. More particularly, it relates to polyvinyl esters which display marked anti-bacterial and anti-fungal characteristics. Still more particularly, it relates to molded vinyl resins and to plasticizers therefor and to a novel method of incorporating arsenosobenzene compounds having microbiocidal properties as a component of the plasticizers.

In accordance with the invention, a solution of an arsenosobenzene is prepared, the solution is introduced into a compatible plasticizer and the plasticizer composition incorporated into vinyl resins which will be subject to mechanical manipulation, i.e., to pressing, swaging, molding, etc., to produce molded objects, flexible sheeting and film, coating compositions, and the like.

In general, resinous materials such as polymers and copolymers of polyvinyl esters are inert to microbial and fungal attack. Nevertheless, they readily act as carriers for microorganisms and the surface of resinous articles may become contaminated with materials which function as nutrients for the microorganisms so that the growth of the latter can occur on such surfaces. In addition to being a continuous source of contamination, the articles themselves are often subject to deterioration due to bacterial and fungal attack on the plasticizers incorporated into the resins to impart certain desirable physical properties and to facilitate molding operations.

It has been common practice, in order to protect resins from bacterial and fungal deterioration to incorporate agents for the purpose of rendering the resinous products bacteriostatic. Most of these agents have suffered from the disadvantage that their solubility in the resins or in the plasticizers was limited, or they were relatively fugitive, as a consequence of which their effectiveness was of limited duration. A further disadvantage has been that the known agents must be used in relatively large concentrations, as for example, 2% to 4% of the resin. This is ordinarily objectionable both from the viewpoint of cost and because the excessive amount of bacteriostat may adversely affect the color or the physical properties of the resin.

The method of incorporating the agents capable of imparting bactericidal and fungicidal properties, used hereto, has been to mill in, for example, powdered fungicidal agent or to mix in the resin being compounded, a solution of the agent in such compatible fugitive solvents as toluene, benzene, and the like.

Now, it has been discovered that arsenosobenzene which has a limited solubility, generally below economically practical levels, in the fugitive solvents commonly available in the plastic industry, for example, glycols such as propylene glycol, ethers such as ethylene glycol, monobutyl ether, ketones such as ethyl methyl ketone, diisobutyl ketone, etc., and the like and also insoluble in plasticizers such as, dioctyl phosphate, tricresyl phosphate, epoxidized tallate, butyl phthalyl butyl glycolate, ethyl silicylate, and the like, can be incorporated in effective small amounts in a unique solution form compatible with the plasticizers to provide the compositions with excellent anti-bacterial and anti-fungal properties. The arsenosobenzene compounds when incorporated by this phenol solvent solution method display an effective microbicidal and fungicidal action rather than a mere inhibition of the growth of such bacteria.

As above indicated, relatively small amounts of the arsenosobenzene component, i.e., amounts of the order of 100 to 500 parts per million, present in the resinous compositions in a solution form are effective to produce the desired effect.

The arsenosobenzene compound to be employed in accordance with the present invention is a tervalent arsenic compound having the general formula:

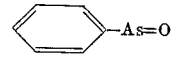

The arsenosobenzene compound is prepared for incorporation in solution form into a plasticizer and for subsequent incorporation into resins by dissolving in hydroxyl-bearing solvents in which the compounds are soluble to the extent of at least 5%. Generally, arsensosobenzene has a higher solubility in compounds such as the monohydric and polyhydric phenols and the combination of arsensosobenzene and the phenols are preferred because quantities of arsenosobenzene of the order of 200 to 500 parts per million are obtainable with lesser amounts of solvent phenols, which phenols cannot be tolerated in, for example, vinyl resins in too great a proportion.

Materials useful as a solvent for the arsenosobenzene compounds are those having a labile hydroxyl group. Useful compounds are mono and di-hydroxy compounds, for example, phenol, phenol derivatives, for example, the alkyl phenols, such as cresols, e.g., methyl phenol, 2-methyl-5-isopropyl phenol, 3-methyl-6-isopropyl phenol, and the like. Chlorinated phenols such as 4-chloro-2-phenylphenol, 6-chloro-2-phenylphenol, etc., amino phenols such as p-aminophenol, m-aminophenol, etc., dihydric phenols such as catechol, resorcinol, 3,5-dihydric toluene, and the like, aliphatic alcohols having 5 to 12 carbon atoms such as lauric, 2 ethyl hexanol, octenol, 1,2,6-hexanetriol, 2-methoxy methyl-2,4-dimethyl pentane diol, and the like, and monocarboxylic acid having 5 to 12 carbon atoms such as caproic acid, 2-ethyl hexoic acid, isotoic acid, and the like. The solvent carrier compatible with the plasticizers which is preferred, is a non-toxic alkyl phenol, such as nonyl phenol, dodecyl phenol, di-sec amyl phenol, and the like. The solution of arsenosobenzene in a solvent containing a labile hydroxyl group is incorporated into a plasticizer for the resin to be mechanically worked. Typical plasticizers are tricresyl phosphate, dipropylene glycol dibenzoate, diphenylcresyl phosphate, epoxidized soya, epoxidized tallate, dioctyl azelate, alkyl aryl phosphates, diisobutyl phthalate, hydrogenated methyl rosin ester, and the like.

The solvent solutions of arsenosobenzene, which are preferred, are those which hold in stable solution between about 10% and about 25% by weight of arsenical although amounts of arsenical as low as 5% may be used. Such a solution can be dissolved and/or dispersed in the plasticizer in amounts constituting between about 2% and about 10% by weight of the total mixture, with amounts in the range between about 4% and about 6% preferred. The plasticizer compositions thus contain between about 0.2% and 2.5% of arsenosobenzene compound, between about 1.8% and 7.5% of solvent and between about 90% and 98% of plasticizer.

When an arsenosobenzene compound is present in a plasticizer in the quantity set forth, the arsenosobenzene content of a processed resin, for example, vinyl resin, will be in the range between about 0.02% and about 0.1%, i.e., amounts in the range between about 200 and 1000 parts per million.

These plasticizers are incorporated into the resins to be worked into a highly plasticized form for flexible and elastomeric products which are fabricated by extruding, calendering, molding, solution-casting, and the like. In the plasticized form of resin, the plasticizers constitute generally between about 25% and 50% of the formula weight. In the preparation of such products, the resin is admixed with plasticizer, stabilizer, lubricant, filler, if present, and the admixture cold mixed in a kneader or mixer for about a half hour. After twenty-four hours standing, the admixture is fluxed and milled.

In order to more fully illustrate the preparation of resinous products of this invention, the following examples are included. These examples are intended to be illustrative and are given without any intention that the invention be limited thereto.

Example 1

A solution indicated solution A was prepared by mixing 20 parts by weight of arsenosobenzene into 80 parts by weight of di-secondary amyl phenol. The mixture was heated to approximately 230° F. to attain a temperature sufficient to melt the arsenosobenzene. After agitation until a uniform solution was attained, the solution was cooled to room temperature.

100 parts of the phenol solution was then mixed with 1900 parts by weight of epoxidized soya.

A plastisol was prepared from the phenol solution containing epoxidized soya which had the following formulation: 1000 parts polyvinyl chloride resin (Geon 121), 435 parts of dioctyl azelate plasticizer, 50 parts of solution A and 15 parts barium-cadmium-zinc soap. The liquid ingredients were mixed and then the solid resin added slowly with agitation. After thorough admixture, the resin was molded to a film of approximately 100 mils thickness and heated for 10 minutes at 350° F. to effect a cure.

The vinyl film was cut into test rectangles, placed on a glass panel so that there was one for each five minutes of test period. The glass panels with the samples were placed in an oven which was maintained at a temperature of 375° F. At each five minute interval, one piece of film was removed up to a total of 60 minutes. The vinyl test rectangles showed that the yellowing of the film containing the phenol solution (solution A) was equal to or less than control films containing no phenol solution.

Test panels were also cut from the vinyl film and subjected to the following test to establish fungicidal activity.

Test panels were placed on nutrient agar surfaces in petri dishes, each agar surface having been previously inoculated with a selected microorganism. The petri dishes were covered and incubated for a period of 14 days for fungi at a temperature of 30° C., and for 34 hours at a temperature of 37° C. for bacteria. At the end of this period, the clear zone indicating inhibition of growth extending outwardly from the test panels was measured. The results are given below in Table I.

TABLE I

| | Organism | Zone of inhibition (mm.) |
| --- | --- | --- |
| Panel containing 5% phenol solution (500 p.p.m. arsine compound). | A. niger | 15 |
| | S. aureus | 12 |
| Control panel containing no micro-biocide | A. niger | 0 |
| | S. aureus | 0 |

Example II

A solution indicated solution B was prepared by mixing 20 parts by weight of arsenosobenzene into 80 parts by weight of nonyl phenol. The mixture was heated to approximately 230° F. to attain a temperature sufficient to melt the arsenosobenzene. After agitation until a uniform solution was attained, the solution was cooled to room temperature.

100 parts of the phenol solution was then mixed with 1900 parts by weight of epoxidized soya.

A plastisol was prepared from the phenol solution having the following formulation, 1000 parts polyvinyl chloride resin (Geon 121), 435 parts of diphenyl cresyl phosphate plasticizer, 50 parts of solution B and 15 parts barium-cadmium-zinc soap. The liquid ingredients were mixed and then the solid resin added slowly with agitation. After thorough admixture, the resin was molded to a film of approximately 100 mil thickness and heated for 10 minutes at 350° F. to effect a cure.

The vinyl film was cut into test rectangles, placed on a glass panel so that there was one for each five minutes of test period. The glass panels with the samples were placed in an oven which was maintained at a temperature of 375° F. At each five minute interval, one piece of film was removed up to a total of 60 minutes. The vinyl test rectangles showed that the yellowing of the film containing the phenol solution (solution B) was equal to or less than control films containing no phenol solution.

Test panels were also cut from the vinyl film and subjected to the test to establish fungicidal activity as described in Example I.

TABLE II

| | Organism | Zone of Inhibition (mm.) |
| --- | --- | --- |
| Panel containing 5% phenol solution (500 p.p.m. arsine compound). | A. niger | 15 |
| | S. aureus | 12 |
| Control panel containing no micro-biocide | A. niger | 0 |
| | S. aureus | 0 |

The foregoing description is given for clearness and understanding only and no unnecessary limitations should be understood therefrom, for modifications will be obvious to those skilled in the art.

I claim:
1. A method of incorporating microbicidal amounts of arsenosobenzene into vinyl resin material which comprises dissolving arsenosobenzene into a solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms, admixing said solvent solution with said vinyl resin material and processing said admixture to desired solid physical form.

2. A method according to claim 1 in which the solvent is a nonyl phenol.

3. A method according to claim 1 in which the solvent solution of arsenosobenzene is distributed uniformly in a plasticizer for vinyl resins selected from the group consisting of tricresyl phosphate, dipropylene glycol dibenzoate, diphenylcresyl phosphate, epoxidized soya, epoxidized tallate, dioctyl azelate, alkyl aryl phosphates, diisobutyl phthalate and hydrogenated methyl rosin ester, to form a single phase system prior to admixing with vinyl resin material.

4. A method according to claim 1 in which the solvent solution is distributed uniformly in a plasticizer selected from the group consisting of tricresyl phosphate, dipropylene glycol dibenzoate, diphenylcresyl phosphate, epoxidized soya, epoxidized tallate, dioctyl azelate, alkyl aryl phosphates, diisobutyl phthalate and hydrogenated methyl rosin ester, to form a single phase solution prior to mixing with polymeric material.

5. A method according to claim 3 in which the resultant solution produced by uniform distribution of arsenosobenzene in a liquid plasticizer for vinyl resins, is mixed with soap and liquid vinyl resin to form a plastisol and the plastisol is then processed to desired physical form.

6. A composition of matter useful for plasticizing vinyl resins and imparting microbicidal properties thereto which comprises a liquid plasticizer for vinyl resins and a microbicidal amount of arsenosobenzene, said arsenosobenzene being present in the plasticizer in the form of solute in a solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms, said solvent and solute being uniformly distributed in said plasticizer to form a single phase system.

7. A composition according to claim 6 wherein the arsenosobenzene is present in the form of the solute in a nonyl phenol solution.

8. A composition according to claim 6 wherein the arsenosobenzene is present in the form of the solute in a mixture of di-secondary amyl phenol and nonyl phenol.

9. A composition of matter comprising a uniform admixture of vinyl resin and a vinyl resin plasticizer containing a microbicidal amount of arsenosobenzene, present in said plasticizer as the solute in a solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms, said solvent and solute being uniformly distributed in said plasticizer to form a single phase system.

10. A composition of matter comprising a uniform admixture of polymerizable resin material and a plasticizer selected from the group consisting of tricresyl phosphate, dipropylene glycol dibenzoate, diphenylcresyl phosphate, epoxidized soya, epoxidized tallate, dioctyl azelate, alkyl aryl phosphates, diisobutyl phthalate and hydrogenated methyl rosin ester containing a microbicidal amount of arsenosobenzene present in said plasticizer as the solute in a solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms, said solvent and solute being uniformly distributed in said plasticizer to form a single phase system.

11. A method of incorporating microbicidal amounts of arsenosobenzene into plasticizable resin material which comprises dissolving arsenosobenzene into a solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms and mono carboxycyclic acids having 5 to 12 carbon atoms, distributing said solvent solution in a plasticizer selected from the group consisting of tricresyl phosphate, dipropylene glycol dibenzoate, diphenylcresyl phosphate, epoxidized soya, epoxidized tallate, dioctyl azelate, alkyl aryl phosphates, diisobutyl phthalate and hydrogenated methyl rosin ester, admixing said single phase plasticizer-solvent solution with said plasticizable resin material and processing said admixture to desired solid physical form.

12. A composition of matter useful for plasticizing vinyl resins and imparting microbicidal properties thereto which comprises between 90% and 98% by weight of plasticizer selected from the group consisting of tricresyl phosphate, dipropylene glycol dibenzoate, diphenylcresyl phosphate, epoxidized soya, epoxidized tallate, dioctyl azelate, alkyl aryl phosphates, diisobutyl phthalate and hydrogenated methyl rosin ester, about 0.2% and 2.5% by weight of arsenosobenzene and between about 1.8% and about 7.5% of solvent selected from the group consisting of phenol, alkyl phenols, chlorinated phenols, amino phenols, dihydric phenols, aliphatic alcohols having 5 to 12 carbon atoms and monocarboxycylic acids having 5 to 12 carbon atoms.

References Cited

UNITED STATES PATENTS 2,967,799  1/1961  Wehner _____ 167—30

ALBERT T. MEYERS, *Primary Examiner.*

J. LEVITT, *Examiner.*

S. J. FRIEDMAN, *Assistant Examiner.*